US009416689B2

(12) United States Patent
Totsuka et al.

(10) Patent No.: US 9,416,689 B2
(45) Date of Patent: Aug. 16, 2016

(54) METHOD AND APPARATUS FOR CONTROLLING A PHASE VARYING APPARATUS

(71) Applicant: NITTAN VALVE CO., LTD., Kanagawa (JP)

(72) Inventors: Takumi Totsuka, Kanagawa (JP); Yutaka Kishiki, Kanagawa (JP)

(73) Assignee: NITTAN VALVE CO., LTD., Kanagawa (JP)

( * ) Notice: Subject to any disclaimer, the term of this patent is extended or adjusted under 35 U.S.C. 154(b) by 0 days.

(21) Appl. No.: 14/749,901

(22) PCT Filed: Dec. 28, 2012

(86) PCT No.: PCT/JP2012/084127
§ 371 (c)(1),
(2) Date: Jun. 25, 2015

(87) PCT Pub. No.: WO2014/103030
PCT Pub. Date: Jul. 3, 2014

(65) Prior Publication Data
US 2015/0377084 A1    Dec. 31, 2015

(51) Int. Cl.
*F01L 1/34*     (2006.01)
*F01L 1/344*    (2006.01)
(Continued)

(52) U.S. Cl.
CPC ............. *F01L 1/344* (2013.01); *F02D 13/0238* (2013.01); *F02D 35/028* (2013.01);
(Continued)

(58) Field of Classification Search
CPC ............ F01L 1/344; F01L 2001/34483; F01L 2001/3522; F01L 2250/02; F01L 2800/00; F02D 13/0238; F02D 35/028; F02D 41/1403; F02D 41/0002; G05B 13/0255; G05B 13/026; G05B 19/19; G05B 2219/41259; G05B 2219/41385; G05B 2219/42249; G05B 2219/45

USPC ....................................................... 123/90.17
See application file for complete search history.

(56) References Cited

U.S. PATENT DOCUMENTS 6,860,245 B2 * 3/2005 Hosoya ..................... F01L 1/34
                                                                 123/90.15
2003/0131812 A1    7/2003 Hosoya

FOREIGN PATENT DOCUMENTS

JP          63128401 A        6/1988
JP          63128401 U        8/1988
(Continued)

OTHER PUBLICATIONS

PCT/JP2012/084127; International Search Report; Jan. 29, 2013.

*Primary Examiner* — Zelalem Eshete
(74) *Attorney, Agent, or Firm* — Fulwider Patton LLP

(57) ABSTRACT

[Problems to be Solved]
In the valve opening and closing timing controlled by an ECU, since the responsivity of a phase varying apparatus becomes low and the valve opening and closing timing cannot be appropriately controlled in the state of low engine rpm, desired engine characteristics cannot be obtained. Therefore, it is a problem to be solved by the present invention to provide a method and an apparatus for controlling a phase varying apparatus capable of obtaining the considerably high responsiveness of the phase varying apparatus under condition of low engine rpm.

[Solution]
The above problem can be solved by a phase control method for controlling a phase varying apparatus constituted so as to calculate an estimated relative angle value one step later by the Kalman filter using a relative angle calculated from rotational velocity values of the associated shafts in the current step and a command value to an electromagnetic clutch in the current step, input the estimated relative angle value to a sliding mode controller as a feedback signal, calculate a command value to the electromagnetic clutch one step later based on the value of the feedback signal and output the command signal.

10 Claims, 7 Drawing Sheets

(51) Int. Cl.
*F02D 13/02* (2006.01)
*G05B 13/02* (2006.01)
*G05B 19/19* (2006.01)
*F02D 41/14* (2006.01)
*F02D 41/00* (2006.01)
*F02D 35/02* (2006.01)
*F01L 1/053* (2006.01)
*F01L 1/352* (2006.01)

(52) U.S. Cl.
CPC ........ *F02D41/0002* (2013.01); *F02D 41/1403* (2013.01); *G05B 13/026* (2013.01); *G05B 13/0255* (2013.01); *G05B 19/19* (2013.01); *F01L 2001/0537* (2013.01); *F01L 2001/34483* (2013.01); *F01L 2001/3522* (2013.01); *F01L 2250/02* (2013.01); *F01L 2800/00* (2013.01); *F02D 2041/001* (2013.01); *F02D 2041/1412* (2013.01); *F02D 2041/1417* (2013.01); *G05B 2219/41259* (2013.01); *G05B 2219/41385* (2013.01); *G05B 2219/42249* (2013.01); *G05B 2219/42352* (2013.01); *G05B 2219/45006* (2013.01); *Y02T 10/18* (2013.01); *Y02T 10/42* (2013.01)

(56) References Cited

FOREIGN PATENT DOCUMENTS

| | | |
|---|---|---|
| JP | 02161767 A | 6/1990 |
| JP | 02180854 A | 7/1990 |
| JP | 03206710 A | 9/1991 |
| JP | 08115867 A | 5/1996 |
| JP | 09131406 A | 5/1997 |
| JP | 200136504 A | 12/2001 |
| JP | 2007531478 A | 11/2007 |
| JP | 2007537896 A | 12/2007 |
| WO | 2005008890 A1 | 1/2005 |
| WO | 2005110711 A1 | 11/2005 |
| WO | 2014103030 A1 | 7/2014 |

\* cited by examiner (a)

(b)

METHOD AND APPARATUS FOR CONTROLLING A PHASE VARYING APPARATUS

FIELD OF THE INVENTION

The present invention relates to a control method and a control apparatus for controlling a phase varying apparatus for varying the opening and closing timing of a valve.

BACKGROUND OF THE INVENTION

A method of using a phase varying apparatus for varying the opening and closing timing of an engine valve is adopted as a method for optimizing performance of an automobile engine over its entire velocity range from a low velocity range to a high velocity range. In this specification, "engine performance" widely includes fuel economy performance, engine response, low emission performance, idling stability and the like. The phase varying apparatus can select the optimal valve opening and closing timing in accordance with engine operating conditions such as engine rpm by varying the phase relationship of a crankshaft and a camshaft, thereby immensely improving engine performance.

Patent Publication No. 1 discloses a phase varying apparatus for operating a ring gear and a planetary gear of a planetary gear train using two electromagnetic clutches and the main unit of this phase varying apparatus is directly connected to the camshaft. Since the phase varying apparatus is directly connected to the engine, the phase varying apparatus is installed in an environment easily affected by external disturbances such as engine temperature, ambient temperature, vibration and the like. Therefore, in an ECU (engine control unit) constituting controller, not only conventional PID control but also a sliding mode control of high robustness is employed to appropriately control the valve opening and closing timing.

PRIOR ART PUBLICATION

Patent Publication

Patent Publication No. 1

Japanese Patent Application Laid Open No. 2008-115867

SUMMARY OF THE INVENTION

Problems to be Solved by the Invention

The valve opening and closing timing is controlled by the ECU based on the crankshaft rpm but in the case where the engine rpm is low in the idling state or the like, since information input to the ECU decreases, the responsiveness of the phase varying apparatus becomes low and desired engine performance sometimes cannot be obtained. An object to be achieved by the present invention is therefore to provide a phase control method and a phase control apparatus for controlling a phase varying apparatus capable of enabling the phase varying apparatus to achieve adequately high responsiveness under a condition of low engine rpm.

Means for Solving the Problems

According to the present invention, the following technical means are provided for solving the above mentioned problem. More specifically, an invention defined in claim 1 is directed to a phase control method for controlling a phase varying apparatus 51 for varying a valve timing of an engine valve in an internal combustion engine 11 by varying a phase of rotation of a camshaft 53 with respect to a crankshaft 22, the phase varying apparatus 51 comprising a driving rotor to which rotation is transmitted from the crankshaft, a driven rotor which is coaxial with the drive rotor and disposed on a side of the camshaft and a phase variation mechanism for varying a relative angle between the driving rotor and the driven rotor using an electromagnetic clutch 70 to control the phase varying apparatus 51, wherein a relative angle between the crankshaft and the camshaft in the current step, which is calculated based on a rotational velocity value of the crankshaft 22 and the rotational velocity value of the camshaft 23, and a command value to the electromagnetic clutch 70 in the current step are inputted into a phase varying apparatus estimator 51 and wherein an estimated relative angle value one step later is calculated by a Karman filter using the thus inputted values in the phase varying apparatus estimator 51 so as to input the thus calculated estimated relative angle value one step later to a sliding mode controller 103 as a feedback signal, and wherein a command value to the electromagnetic clutch 70 one step later is calculated using common parameters to those used in the phase varying apparatus estimator 51 based on the thus inputted value in the sliding mode controller 103 and the thus calculated command value is outputted to the phase varying apparatus 51.

Further, an invention defined in claim 2 is directed to a phase control method in accordance with claim 1, wherein the command value to the electromagnetic clutch 70 is calculated from an output value from the sliding mode controller 103 and an output value from a feed forward controller 111 for equalizing the relative angle to a target phase angle registered in advance.

Furthermore, an invention defined in claim 3 is directed to a phase control method in accordance with claim 1 or 2, wherein when a sensor flag of a sensor for detecting a rotation angle of the crankshaft 22 or the camshaft 53 in the internal combustion engine 11 is not set, the Kalman filter calculates an estimated relative angle value one step later from only the command value to the electromagnetic clutch 70 in the current step, and when the sensor flag is set, the Kalman filter calculates an estimated relative angle value one step later based on the relative angle in the current step and the command value to the electromagnetic clutch 70 in the current step.

Moreover, an invention defined in claim 4 is directed to a phase control method in accordance with any one of claims 1 to 3, wherein system identification of the phase varying apparatus 51 is effected by the Kalman filter using the relative angle in the current step and the command value to the electromagnetic clutch 70 in the current step to create a parametric model and the estimated relative angle value one step later is calculated using the parametric model.

Further, an invention defined in claim 5 is directed to a phase control apparatus for controlling a phase varying apparatus 51 for varying a valve timing of an engine valve in an internal combustion engine 11 by varying a phase of rotation of a camshaft 53 with respect to a crankshaft 22, the phase varying apparatus comprising a driving rotor to which rotation is transmitted from the crankshaft, a driven rotor which is coaxial with the driving rotor and disposed on a side of the camshaft 53, and a phase variation mechanism for varying a relative angle between the driving rotor and the driven rotor using an electromagnetic clutch 70 to control the phase varying apparatus 51, the phase control apparatus comprising a phase variable apparatus estimator 107 for calculating an estimated relative angle value one step later by Kalman filter using a relative angle between the crankshaft 22 and the camshaft 53 in the current step calculated based on a rotational velocity value of the crankshaft 22 and a rotational velocity value of the camshaft 53, and a command value to the electromagnetic clutch 70 in the current step, and a sliding mode controller 103 for receiving the estimated relative angle value one step later as a feedback signal and a command value to the electromagnetic clutch 70 one step later is calculated using parameters common to those used for the calculation in the phase varying apparatus estimator 107 based on the input value of the feedback signal, and outputting the thus calculated command value one step later.

Furthermore, an invention defined in claim 6 is directed to a phase control apparatus in accordance with claim 5, wherein the command value to the electromagnetic clutch 70 is calculated based on an output value from the sliding mode controller 103 and an output value from a feed forward controller 111 for equalizing the relative angle to a target phase angle registered in advance.

Moreover, an invention defined in claim 7 is directed to a phase control apparatus in accordance with claim 5 or 6, which further comprises a phase varying apparatus estimator 107 and in which when a sensor flag of a sensor for detecting a rotation angle of the crankshaft 22 or the camshaft 53 in the internal combustion engine 11 is not set, the Kalman filter calculates the estimated relative angle value one step later from only the command value to the electromagnetic clutch 70 in the current step, and when the sensor flag is set, the Kalman filter calculates the estimated relative angle value one step later and the command value to the electromagnetic clutch in the current step and feeds back the estimated relative angle value one step later.

Further, an invention defined in claim 8 is directed to a phase control apparatus in accordance with any one of claims 5 to 7, which further comprises a phase varying apparatus estimator 107 for effecting system identification of the phase varying apparatus 51 by the Kalman filter using the relative angle in the current step and the command value to the electromagnetic clutch 70 in the current step to create a parametric model and the estimated relative angle value one step later is calculated using the parametric model.

Technical Advantages of the Invention

According to the invention defined in claim 1 or the invention defined in claim 5, an estimated relative angle value one step later is calculated in the phase varying apparatus estimator 107 based on a relative angle calculated from the rotational velocity of the crankshaft 22 and the rotational velocity of the camshaft 53 and a command value to the electromagnetic clutch 70 in the current step, so as to input the thus calculated estimated relative angle value to the sliding mode controller 103 as a feedback signal and a command value to the electromagnetic clutch 70 one step later in the sliding mode controller 103. Therefore, even in the case where the rotational velocity of the crankshaft 22 is low, a necessary number of input signals for the sliding mode controller 103 can be obtained. Further, since the calculation of the estimated relative angle value in the phase varying apparatus estimator 107 and the calculation of the command value in the sliding mode controller 103 are effected using common parameters, it is possible to apply a model information estimated by the phase variable apparatus estimator 107 to the control of the sliding mode controller 103 and therefore, the phase varying apparatus can be controlled with high responsivity and control performance can be improved.

According to the invention defined in claim 2 or the invention defined in claim 6, in addition to the technical effects of the invention defined in claim 1 or the invention defined in claim 5, since the command value to the electromagnetic clutch one step later is calculated from the output value from the sliding mode controller and the output value from the feed forward controller for outputting the target phase angle registered in advance, the resistance to disturbance of the entire system can be improved.

According to the invention defined in claim 3 or the invention defined in claim 7, in addition to the technical effects of the invention defined in claim 1 or 2 or the invention defined in claim 5 or 6, when a sensor flag of the sensor for detecting a rotation angle of the associated shaft in the internal combustion engine 11 is not set, the Kalman filter calculates an estimated relative angle value one step later from only the command value to the electromagnetic clutch in the current step, and when the sensor flag is set, the Kalman filter calculates an estimated relative angle value one step later based on the relative angle in the current step and the command value to the electromagnetic clutch in the current step. Therefore, the estimated relative angle value can be calculated by acquiring an accurate value when the sensor responds, whereby an accurate command can be supplied to the electromagnetic clutch.

According to the invention defined in claim 4 or the invention defined in claim 8, in addition to the technical effects of the invention defined in any one of claims 1 to 3 or those of the invention defined in any one of claims 5 to 7, the system identification of the phase varying apparatus is effected by the Kalman filter to create a parametric model and the estimated relative angle value is calculated one step later using the parametric model. Therefore, it is possible to send a more accurate command to the electromagnetic clutch.

PREFERRED EMBODIMENTS OF THE INVENTION

Preferred embodiments of the present invention will be described below in detail based on the above technical idea with reference to accompanying drawings.

A preferred embodiment of the present invention will be described below with reference to accompanying drawings.

Figure 1:
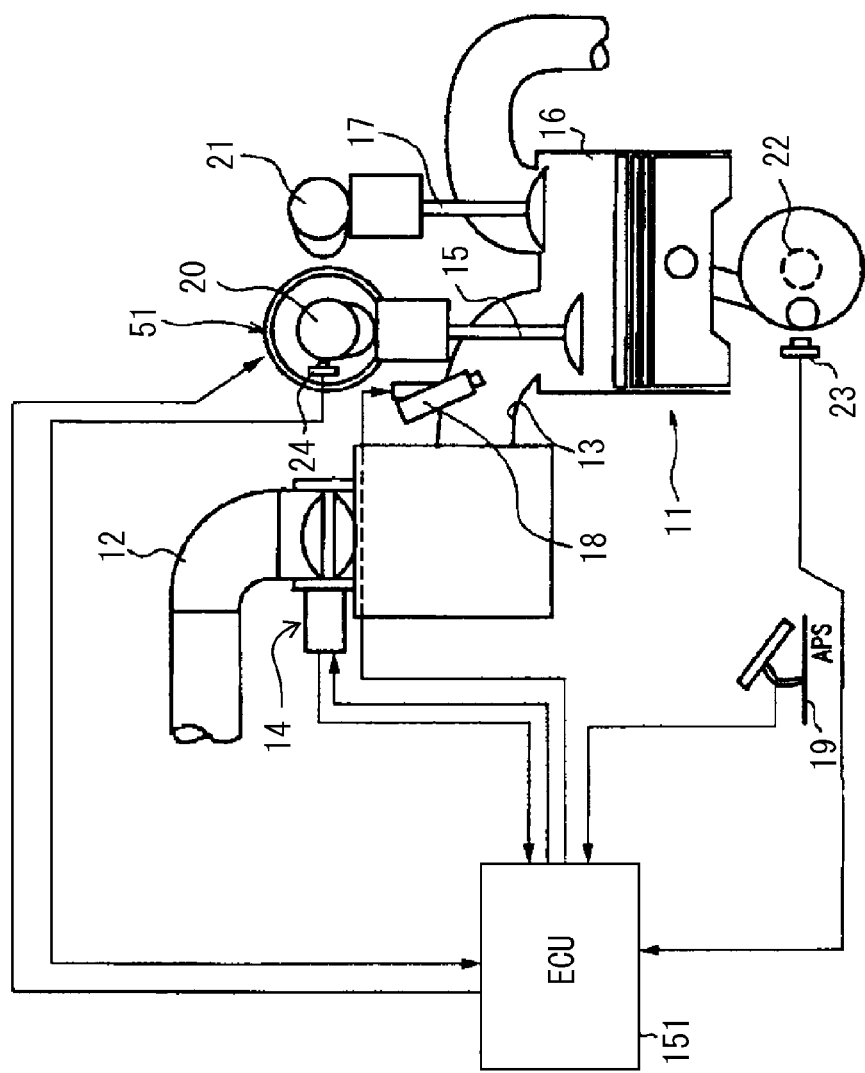
FIG. 1 is a configuration diagram of an internal combustion engine for a vehicle.

FIG. 1 is a configuration diagram showing a phase varying apparatus according to the preferred embodiment and an internal combustion engine for a vehicle on which the phase varying apparatus and a controller for controlling it are mounted. An electronically controlled throttle valve 14 is provided in an intake passage 12 of the internal combustion engine 10 and air is inspired through the electronically controlled throttle valve 14 and an intake valve 15 into a combustion chamber 16.

Exhausted gas is discharged from the combustion chamber 16 through an exhaust valve 17, and after being cleaned, is ejected into the atmosphere. The intake valve 15 and the exhaust valve 17 are driven to be opened and closed by cams mounted on an exhaust-side camshaft 21 and an intake side camshaft 20, respectively. A phase varying apparatus 51 is provided on the intake-side camshaft 20 that varies valve timing by varying the phase of the camshaft with respect to a crankshaft 22, namely, a relative angle.

Although the phase varying apparatus 51 is provided on only the intake side in this preferred embodiment, instead of the phase varying apparatus 51 on the intake side or in addition to the phase varying apparatus 51 on the intake side, a phase varying apparatus 51 may be provided on the side of the exhaust valve 17.

An electromagnetic fuel injection valve 18 is provided at an intake port 13 at an upstream portion of the intake valve 15 of each of cylinders and the fuel injection valve 18 is configured so that when it is driven to be opened by an injection pulse signal from an engine control unit (ECU) 151, it injects fuel adjusted to a predetermined pressure toward the intake valve 15.

Detected signals are input to the ECU 151, which has a built-in microcomputer, from various sensors, and the ECU 151 performs arithmetic processing based on the inputted detected signals to control the electronically controlled throttle valve 14, the phase varying apparatus 51, the fuel injection valve 18 and the like. A phase control apparatus 102, according to the present invention, of the phase varying apparatus 51 is incorporated into the ECU 151.

As sensors, there are provided an accelerator position sensor 19 for detecting the position of the accelerator, a crank angle sensor 23 for detecting a rotation signal from the crankshaft 22, a cam angle sensor 24 for detecting a rotation signal from the intake-side camshaft 20 and the like.

Figure 2:
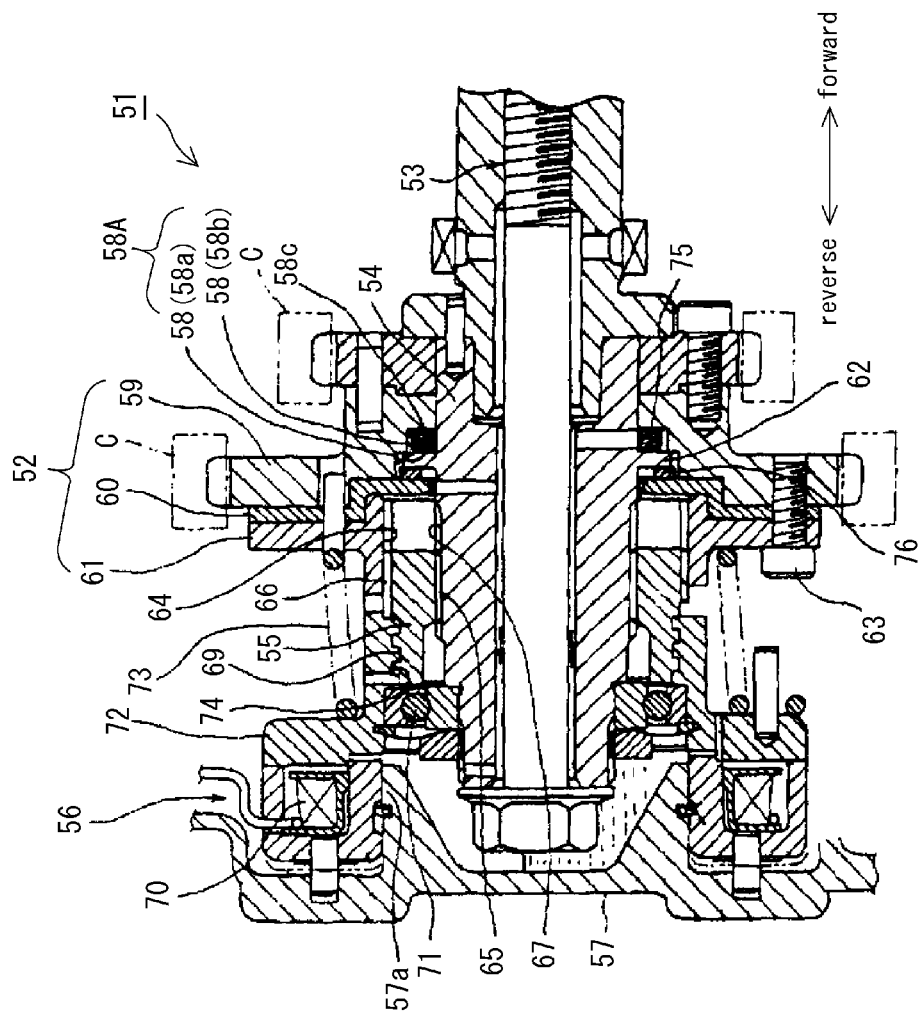
FIG. 2 is a longitudinal cross sectional view of a phase varying apparatus which is an apparatus to be controlled by a controlling method according to a preferred embodiment of the present invention.

One embodiment of the phase varying apparatus 51 which is an apparatus to be controlled by the phase control apparatus 102 according to the present invention will be described below with reference to the accompanying drawings. FIG. 2 shows a longitudinal view of the phase varying apparatus 51 and FIG. 3 is a perspective view showing the internal structure of the phase varying apparatus 51 shown in FIG. 2.

Figure 3:
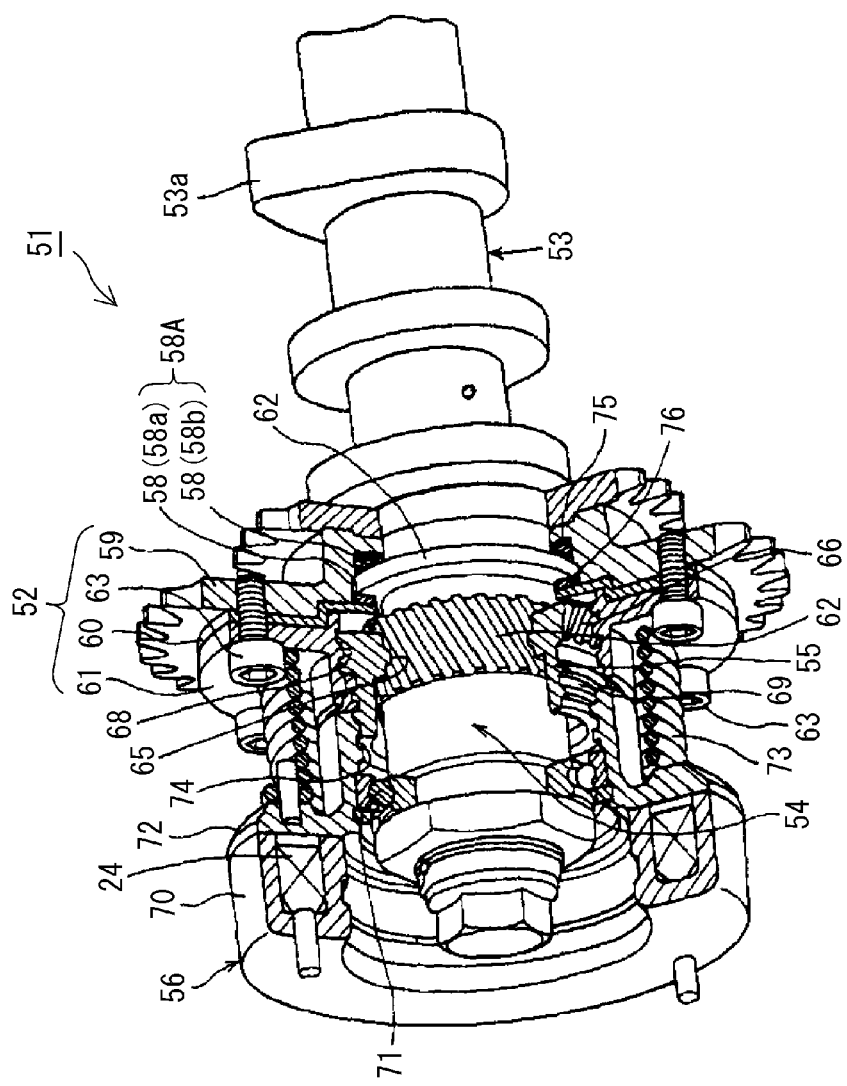
FIG. 3 is a perspective view showing the internal structure of the phase varying apparatus shown in FIG. 2.

The phase varying apparatus 51 shown in FIGS. 2 and 3 is used in a state integrally built into an internal combustion engine 11 of an automobile and constituted so that it transmits the rotation of the crankshaft 22 to the camshaft 53 so as to open and close the intake valve 15 and the exhaust valve 17 in synchronism with the rotation of the crankshaft 22 and controls the opening and closing timings of the intake valve 15 and the exhaust valve 17 of the internal combustion engine 11 depending upon driving conditions such as load applied on the internal combustion engine, engine rpm and the like.

The phase varying apparatus 51 includes an annular-shaped external cylinder portion 52 which is a sprocket to which a drive force of the crankshaft 22 of the internal combustion engine 11 is transmitted, an annular-shaped internal cylinder portion 54 disposed coaxially with the external cylinder portion 52 on the driven side, and which can be relatively rotated in relation to the external cylinder portion 52 and constitutes a part of the camshaft 53, an intermediate movement member 55 which helical-spline-engages with the external cylinder portion 52 and the internal cylinder portion 54 to be disposed therebetween and moves in the axial direction to vary the phase of the internal cylinder portion 54 with respect to the external cylinder portion 52, and an electromagnetic braking means 56 for operating the intermediate movement member 55 which is provided on the side of the internal cylinder portion 54 on which the camshaft 53 is not provided and is mounted on the cover (an engine case) 57. The intermediate movement member 55 and the electromagnetic braking means 56 constitute a phase variation mechanism. In this preferred embodiment, the external cylinder portion 52 corresponds to the driving rotor and the internal cylinder portion 54 corresponds to the driven rotor. Although the phase variation mechanism is driven by the electromagnetic braking means 56 in this embodiment, in some cases the electromagnetic braking means is driven by an electric motor and the phase variation mechanism is hydraulically driven.

The external cylinder portion 52 includes a sprocket body 59 formed with a ring-like concave portion 58 at an inner circumference edge, an inner flange plate 60 which is in close contact with the side surface of the sprocket body 59 and forms a flange engagement groove 58A in cooperation with the concave portion 58, and a spline case 61 which co-fasten the inner flange plate 60 to the sprocket body 59 and is formed on the inner circumference thereof with a spline-engagement portion for engagement with the intermediate movement member 55.

A step portion 58c is provided to face the outer circumference edge of a flange 62 described later on the side of the internal cylinder portion 54 between a large diameter concave portion 58a of the concave portion 58 on the opening side thereof and the small diameter concave portion 58b of the concave portion 58 on the back side thereof.

The rotation of the crankshaft 22 of the internal combustion engine 11 is transmitted via a chain C to the external cylinder portion 52 serving as a sprocket (the sprocket body 59). The reference numeral 63 designates a fastening screw for integrating the sprocket body 59, the inner flange plate 60 and the spline case 61. Since the sprocket body 59, the inner flange plate 60 and the spline case 61 constitute the sprocket (the external cylinder portion 52), it is easily to form a flange engagement groove 58A and form a spline engagement portion 64 in the external cylinder portion 52 (the spline case 61).

A part of the inner and outer circumferential surface of the intermediate movement member 55 is formed with a male helical spline 65 and a female helical spline 66 and the outer circumferential surface of the internal cylinder portion 54 is formed with a male helical spine 67. The inner circumferential surface of the spline case 61 is formed with a female helical spine 68. Here, since the directions of the spline 65 formed on the inner circumferential surface of the intermediate movement member 55 and the spline 66 formed on the outer circumferential surface thereof are reverse, the phase of the internal cylinder portion 54 with respect to the phase of the external cylinder portion 52 can be greatly varied by slightly movement of the intermediate movement member 55 in an axial direction. The outer circumferential surface of the intermediate movement member 55 is formed with a male square screw thread portion 69.

The electromagnetic braking means 56 includes a an electromagnetic clutch 70 supported by the cover (engine case) 57, a rotatable drum 72 which is rotatably supported by a bearing 71 in the internal cylinder portion 54, with which the male square screw thread portion 69 of the intermediate movement member 55 engages and to which the braking force is transmitted from the electromagnetic clutch 70, and a torsion coil spring 73 in the axial direction between the rotatable drum 72 and the external cylinder portion 52.

The electromagnetic clutch 70 is mounted on the outer side of a boss portion 57a of the cover 57. The inner surface of the rotatable drum 72 is formed with a female square screw thread portion 74 and the rotatable drum 72 and the intermediate movement member 55 can be relatively rotated in the circumferential direction along the square screw thread portions 74, 69. Specifically, the intermediate movement member 55 can be moved in the axial direction while being rotated along the square screw thread portions 74, 69.

Further, the rotatable drum 72 and the external cylinder portion 52 are connected with each other by the wound-up torsion coil spring 73 and when no braking force is applied to the rotatable drum 72, the external cylinder portion 52, the internal cylinder portion 54, the intermediate movement member 55 and the rotatable drum 72 are integrally rotated. Moreover, since the torsion coil spring 73 disposed between the rotatable drum 72 and the external cylinder portion 52 (the spline case 61) is disposed in the axial direction, the entirety of the phase varying apparatus can extend in the axial direction by a distance equal to the extendable length of the torsion coil spring 73, while the phase varying apparatus is compact in the radial direction.

The intermediate movement member 55 is moved along the square screw thread portions 74, 69 in the axial direction, while being rotated by controlling ON and OFF of the electromagnetic clutch 70 and current supplied to the electromagnetic clutch 70, whereby the phases of the external cylinder portion 52 and the internal cylinder portion 54 are varied so that the valve opening and closing timing is adjusted by a cam 53a of the camshaft 53.

More specifically, when the electromagnetic clutch 70 is not yet turned ON (no current is supplied), the electromagnetic clutch 70 is located at a position indicated by the chain double-dashed line in FIG. 2 so that a gap is formed between the rotatable drum 72 and the electromagnetic clutch 70 and the external cylinder portion 52 and the internal cylinder portion 54 are integrally rotated without phase difference therebetween. When the electromagnetic clutch 70 is turned ON (current is supplied), the electromagnetic clutch 70 slides to the right in FIG. 2 to attract the rotatable drum 72, whereby a braking force transmitted from the electromagnetic clutch 70 is applied to the rotatable drum 72.

As a result, delay of rotation is generated in the rotatable drum 72 with respect to the external cylinder portion 52. More specifically, the intermediate movement member 55 is advanced (moved to the right in FIG. 2) by the square screw thread portions 69, 74 and the internal cylinder portion 54 (the camshaft 53) is rotated with respect to the external cylinder portion 52 (the sprocket body 59) by the male and female helical splines 65, 66 of the intermediate movement member 55 so that the phase of the internal cylinder portion 54 becomes different from that of the external cylinder portion 52. Thus, the rotatable drum 72 is kept at a position where the thus transmitted braking force and a spring force of the torsion coil spring 73 are balanced (a position where the difference in phases of the internal cylinder portion 54 and the external cylinder portion 52 becomes a predetermined value).

On the other hand, when the electromagnetic clutch 70 is turned OFF, since no braking force is transmitted from the electromagnetic clutch 70 to the rotatable drum 72, only the spring force of the torsion coil spring 73 is applied to the intermediate movement member 55 and the intermediate movement member 55 is retracted (moved to the left in FIG. 2) by the square screw thread portions 69, 74 to be returned to its original position and the internal cylinder portion 54 (the camshaft 53) is rotated in a forward direction or a reverse direction with respect to the external cylinder portion 52 (the sprocket body 59), whereby the difference in phases between the internal cylinder portion 54 and the external cylinder portion 52 is eliminated.

In this embodiment, explanation was made as to the case where the phase variation mechanism was operated by the balance between the spring force of the torsion spring 73 and the braking force but the phase variation mechanism may be operated using two electric means, for example.

Further, the outer circumferential surface of the internal cylinder portion 54 (the journal surface between the internal cylinder portion 54 and the sprocket body 59) is formed with the flange 62 and on the other hand, the inner circumferential surface of the external cylinder portion (the sprocket body 59) is formed with the flange engagement groove 58A. Further, friction torque application members 75, 76 are disposed between the side surface of the flange 62 and the side surface of the flange engagement groove 58A. As a result, a friction torque of a sliding portion where the external cylinder portion 52 and the internal cylinder portion 54 slide on each other increases, thereby preventing tapping sound from being generated by collision of teeth of the helical spline engagement portions 67, 65, 66, 64 and the square screw thread portions 69, 74 among the intermediate movement member 55, the external cylinder portion 52 and the internal cylinder portion 54.

Figure 4:
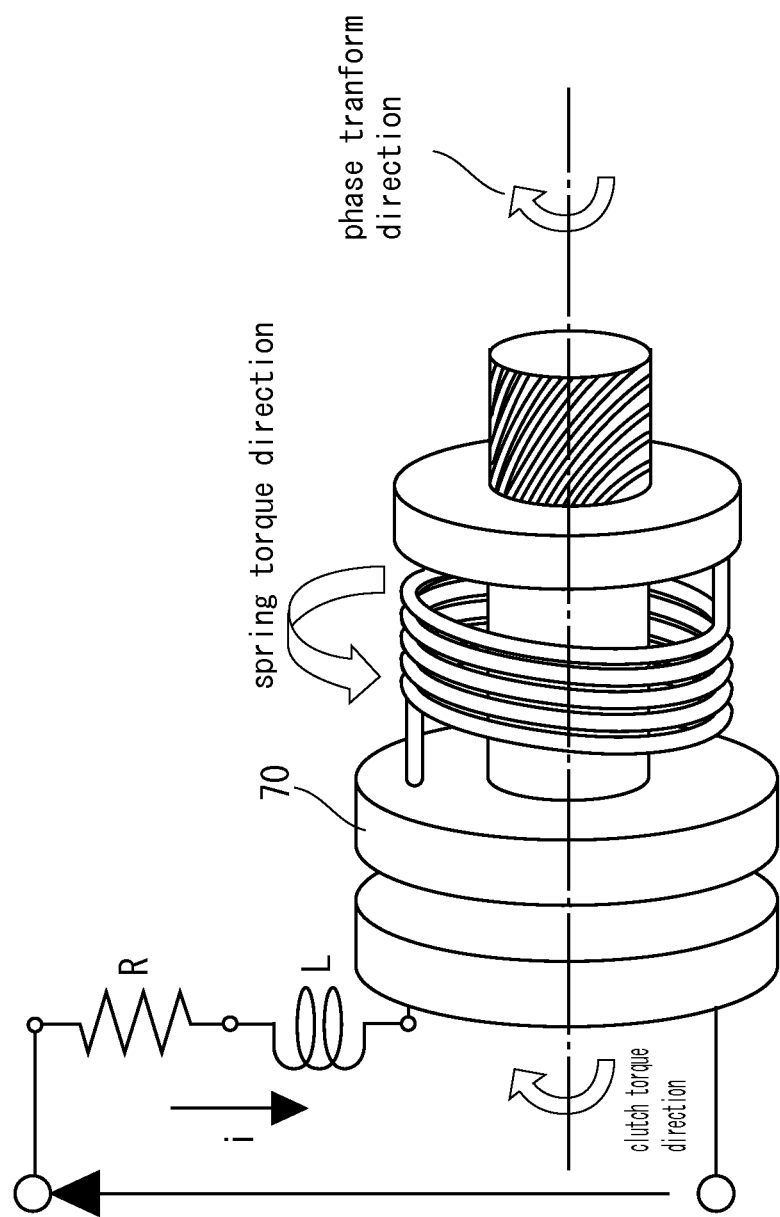
FIG. 4 shows a design model of a control system of the phase varying apparatus shown in FIG. 2.

FIG. 4 shows a design model of a control system of the phase varying apparatus 51 which is an apparatus to be controlled by a controlling method according to a preferred embodiment of the present invention. In this design model of the control system, the clutch torque of the electromagnetic clutch 70 is applied so as to counteract the spring torque of the torsion coil spring 73 applied with an initial torque in a spring torque direction and a relative angle of the internal cylinder portion 54 with respect to the external cylinder portion 52 is generated in a phase transform direction. The equation of state is shown in a mathematical formula 1.

$$\begin{cases} \dot{X}(t) = AX(t) + Bd(t) + D \\ y(t) = CX(t) \end{cases} \quad \text{[Mathematical Formula 1]}$$

In the mathematical formula 1, X (t) is a state variable showing the inner state of the phase varying apparatus 51 which is an apparatus to be controlled, d (t) is an input variable input to the phase varying apparatus 51, y (t) is an output variable from the phase varying apparatus 51 and A, B, C and D are coefficients which can be obtained from constituent elements of the phase varying apparatus 51.

Figure 5:
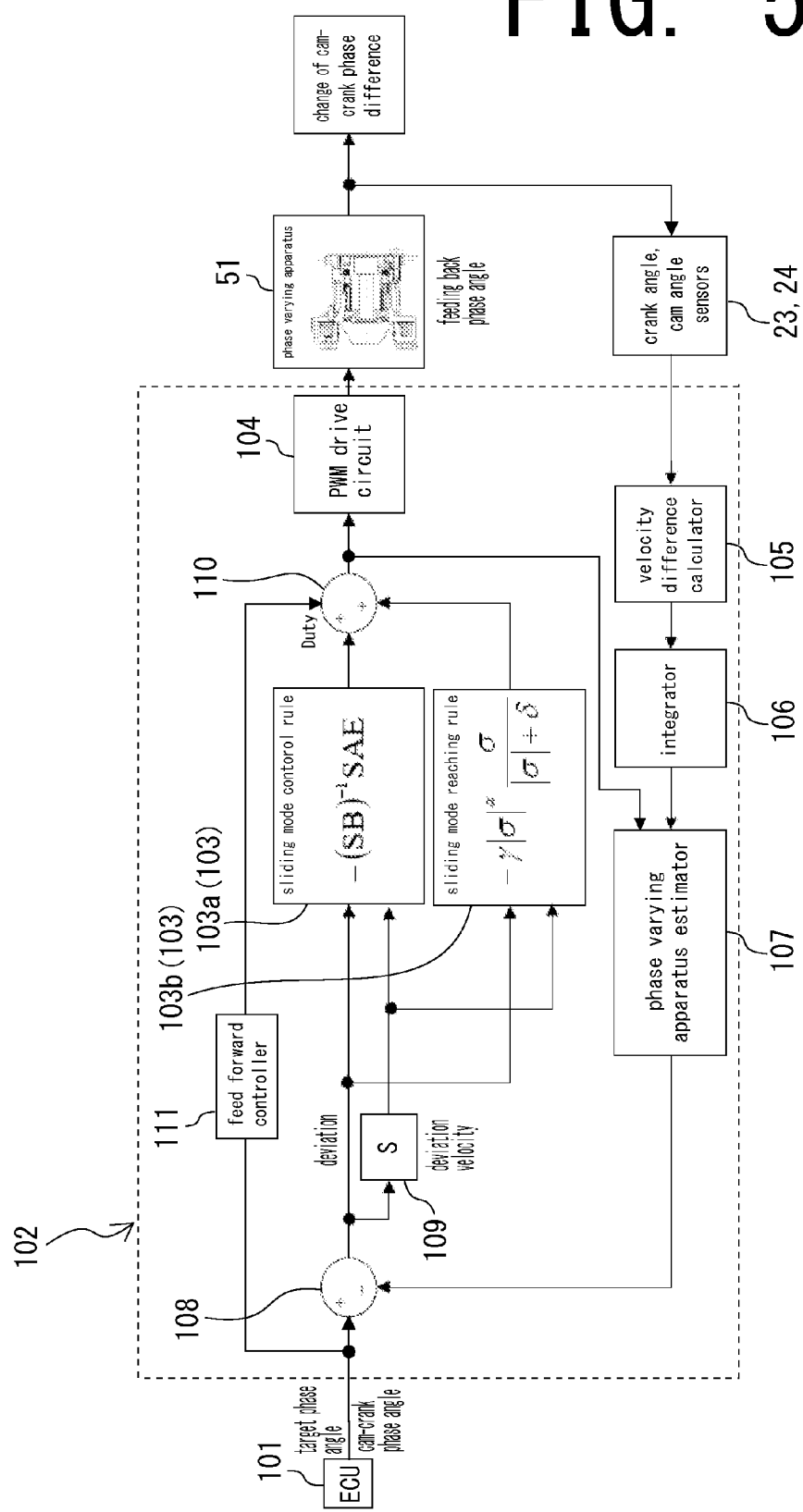
FIG. 5 is a block diagram showing a control system of a phase varying apparatus which is a preferred embodiment of the present invention.

FIG. 5 is a block diagram showing a control system of a controlling apparatus which is a preferred embodiment of the present invention. The phase varying apparatus according to the present invention is constituted by a sliding mode controller 103, a velocity difference calculator 105 for receiving positional information from the crank angle sensor 23 and the cam angle sensor 24 and calculating the difference in velocity of the cams, an integrator 106 for integrating velocity values from the velocity difference calculator 105, a phase varying apparatus estimator 107 for calculating an estimated relative velocity value from the output of the integrator 106, a feed forward controller 111 for calculating an output value for equalizing a phase angle to a target phase angle registered in advance, a subtractor 108, a differentiator 109, an adder 110 and a PWM (pulse-width modulation) drive circuit 104 for receiving an output signal from the adder 110 and controlling the electromagnetic clutch 70. The electromagnetic clutch 70 of the phase varying apparatus 51 is controlled by electrical current from the PWM drive circuit 104.

In this embodiment, since a command value to be supplied to the electromagnetic clutch 70 is calculated based on an output value from the sliding mode controller 103 and an output value from the feed forward controller 111 for outputting the target phase angle registered in advance, the entire system can be made to have high resistance to disturbance.

The state equations of each controller and the like will be described below. An equation of state of the target orbit of a relative angle for effecting feed forward control is expressed by a mathematical formula 2. In the mathematical formula 2, r (t) is a target phase angle, Xr (t) is an internal state of the feed forward control system, Ar is a matrix of the feed forward control system and Br is an input matrix of the feed forward control. At this time, an input target value is a step input. A mathematical formula 3 that is a state equation can be obtained from the mathematical formula 1 and mathematical formula 2.

$$\dot{X}_r(T) = A_r \times X_r(t) + B_r r(t) \quad \text{[Mathematical Formula 2]}$$

$$\dot{X}(t) - \dot{X}_r(t) = A\{X(t) - X_r(t)\} + (A - A_r)X_r(t) + Bd(t) - B_r r(t) + D \quad \text{[Mathematical Formula 3]}$$

A mathematical formula 4 can be obtained by dividing d (t) into $d_1$ (t) by feedback control and feed forward input $d_2$ (t) and a feed forward input is given from a mathematical formula 5. At this time, E is a deviation between a target phase angle and a current transform angle.

$$\dot{E} = AE + Bd_1(t) + Bd_2(t) + (A - A_r)X_r - B_r r(t) + D \quad \text{[Mathematical Formula 4]}$$

$$d_2(t) = -\frac{B^T}{\|B\|^2}\{(A - A_r)X_r(t) - B_r r(t) + D\}. \quad \text{[Mathematical Formula 5]}$$

In order to design the sliding mode controller 103, it is necessary to effect switching hypersurface (equivalent control input) design as a first stage, effect a reaching rule (non-linear switching input) design as a second stage and effect chattering prevention design. Since the switching hypersurface design for constraining the state as the first stage basically corresponds to design of a linear control, the design is made by an optimal control theory which is a linear control theory. Concretely, a mathematical formula 6 is obtained by adding the integrator to the mathematical formula 4 to generate an augmentation system and an evaluation function expressed by a mathematical formula 8 is used. Here, Q is a sliding mode weighting function. A solution for minimizing the evaluation function J is represented by a positive definite symmetrical unique solution $P_E$ of the Riccati equation of a mathematical formula 9 and the switching hypersurface can be represented by a mathematical formula 10. In the sliding mode, conditions of a mathematical formula 11 are applied and the equivalent control input $d_{1eq}$ expressed by a mathematical formula 13 can be obtained from a mathematical formula 12. At this time, σ is a sliding mode switching function.

$$\frac{d}{dt}\begin{bmatrix} E_1 \\ E_2 \end{bmatrix} = \begin{bmatrix} A_{11} & A_{12} \\ A_{21} & A_{22} \end{bmatrix}\begin{bmatrix} E_1 \\ E_2 \end{bmatrix} + \begin{bmatrix} B_1 \\ B_2 \end{bmatrix} d_1(t). \quad \text{[Mathematical Formula 6]}$$

$$E(t) = AE(t) + Bd_1(t) \quad \text{[Mathematical Formula 7]}$$

$$\begin{cases} J = \int E^T Q_E E \, dt \\ Q_E = \begin{bmatrix} Q_{E11} & Q_{E12} \\ Q_{E21} & Q_{E22} \end{bmatrix}, Q_{E21}^T = Q_{E12}, Q_E > 0 \end{cases} \quad \text{[Mathematical Formula 8]}$$

$$\begin{cases} P_E A_{11}^* + A_{11}^{*T} P_E + \\ P_E A_{12} Q_{E22}^{-1} A_{12}^T P_E + Q_{11}^* = 0 \\ A_{11}^* = A_{11} - A_{12} Q_{E22}^{-1} Q_{E12}^T \\ Q_{E11}^* = Q_{E11} - Q_{E12} Q_{E22}^{-1} Q_{E12}^T \end{cases} \quad \text{[Mathematical Formula 9]}$$

$$S = [A_{12}^T P_E + Q_{E12}^T, Q_{E22}], \quad \text{[Mathematical Formula 10]}$$

$$\dot{\sigma} = S\dot{E} = 0 \quad \text{[Mathematical Formula 11]}$$

$$S(AE + Bd_{1eq}(t)) = 0 \quad \text{[Mathematical Formula 12]}$$

$$d_{1eq}(t) = -(SB)^{-1}SAE \quad \text{[Mathematical Formula 13]}$$

$$P_E A_{11}^* + A_{11}^{*T} P_E + P_E A_{12} Q_{E22}^{-1} A_{12}^T P_E + Q_{E11}^* = 0$$

$$A_{11}^* = A_{11} - A_{12} Q_{E22}^{-1} Q_{E12}^T$$

$$Q_{E11}^* = Q_{E11} - Q_{E12} Q_{E22}^{-1} Q_{E12}^T \quad \text{[Mathematical Formula 9]}$$

After effecting the switching hypersurface design, in order to constrain the state of the switching hypersurface design, the reaching rule design is effected as the second stage. The reaching rule design is effected by the eventual sliding mode control. A non-linear switching input is defined in a mathematical formula 14 by the eventual sliding mode control. In order to avoiding a chattering phenomenon, a smooth function is used and when an acceleration rate reaching rule function is used, the non-linear switching input can be obtained as expressed in mathematical formula 15. At this time, γ is a sliding mode relay input gain.

$$d_{1RLi}(t) = -\gamma \frac{\sigma}{|\sigma|}. \quad \text{[Mathematical Formula 14]}$$

$$d_{1RL}(t) = -\gamma |\sigma|^\alpha \frac{\sigma}{|\sigma| + \delta} \quad \text{[Mathematical Formula 15]}$$

Therefore, the sliding mode controller 103 can be expressed by a mathematical formula 16. In the preferred embodiment of the present invention where the feed forward controller is used, the sliding mode controller 103 can be expressed by a mathematical formula 17.

$$\begin{aligned} d(t) &= d_1(t) \\ &= d_{1RL}(t) + d_{1eq}(t) \\ &= -(SB)^{-1}SAE - \gamma|\sigma|^\alpha \frac{\sigma}{|\sigma| + \delta} \end{aligned} \quad \text{[Mathematical Formula 16]}$$

$$\begin{aligned} d(t) &= d_1(t) + d_2(t) \\ &= d_{1RL}(t) + d_{1eq}(t) + d_2(t) \\ &= -(SB)^{-1}SAE - \gamma|\sigma|^\alpha \frac{\sigma}{|\sigma| + \delta} - \\ &\quad \frac{B^T}{\|B\|^2}\{(A - A_r)X_r(t) - B_r r(t) + D\} \end{aligned} \quad \text{[Mathematical Formula 17]}$$

A Kalman filter constituting the phase varying apparatus estimator 107 will be described below referring to FIG. 5. When the mathematical formula 1 is discretized using the control period, a mathematical formula 18 can be obtained. A subscript d added to a right side of each of characters expresses discretization. One estimated relative angle value is output to the phase varying apparatus estimator 107 by a plurality of inputs. From rotational velocity value detected by the crank angle sensor 23 for detecting the rotation of the crankshaft 22 and a rotational velocity value detected by the cam angle sensor 24 for detecting the rotation of the intake-side camshaft 20, the velocity difference calculator 105 calculates the difference in these rotational velocity values. Then, the integrator 106 calculates a relative angle between the crankshaft 22 and the camshaft 20 in the current step (hereinafter referred to "the relative angle in the current step") and inputs the relative angle in the current step to the phase varying apparatus estimator 107. Further, a command value in the current step to the electromagnetic clutch 70 is input to the phase varying apparatus estimator 107. Based on these input values, an estimated relative angle value one step later is calculated by the Kalman filter constituting the phase varying apparatus estimator 107 and this value is input to the sliding mode controller 103 as a feedback signal.

$$\dot{X}_d[k+1] = A_d X_d[k] + B_d d_d[k] + D_d$$

$$\gamma_d[k] = C X_d[k]$$ [Mathematical Formula 18]

In this embodiment, the estimated relative angle value in the current step is calculated by the Kalman filter using the relative angle calculated from the rotational velocity values of the crankshaft 22 and the camshaft 53 and the command value input to the electromagnetic clutch 70 in the current step and the thus calculated estimated relative angle value is input to the sliding mode controller 103 as the feedback signal. Therefore, even when the rpm of the crankshaft 22 is low, a necessary number of input signals to be input into the controller can be obtained. Thus, the control system can be made so as to have high responsivity and stability.

Figure 6:
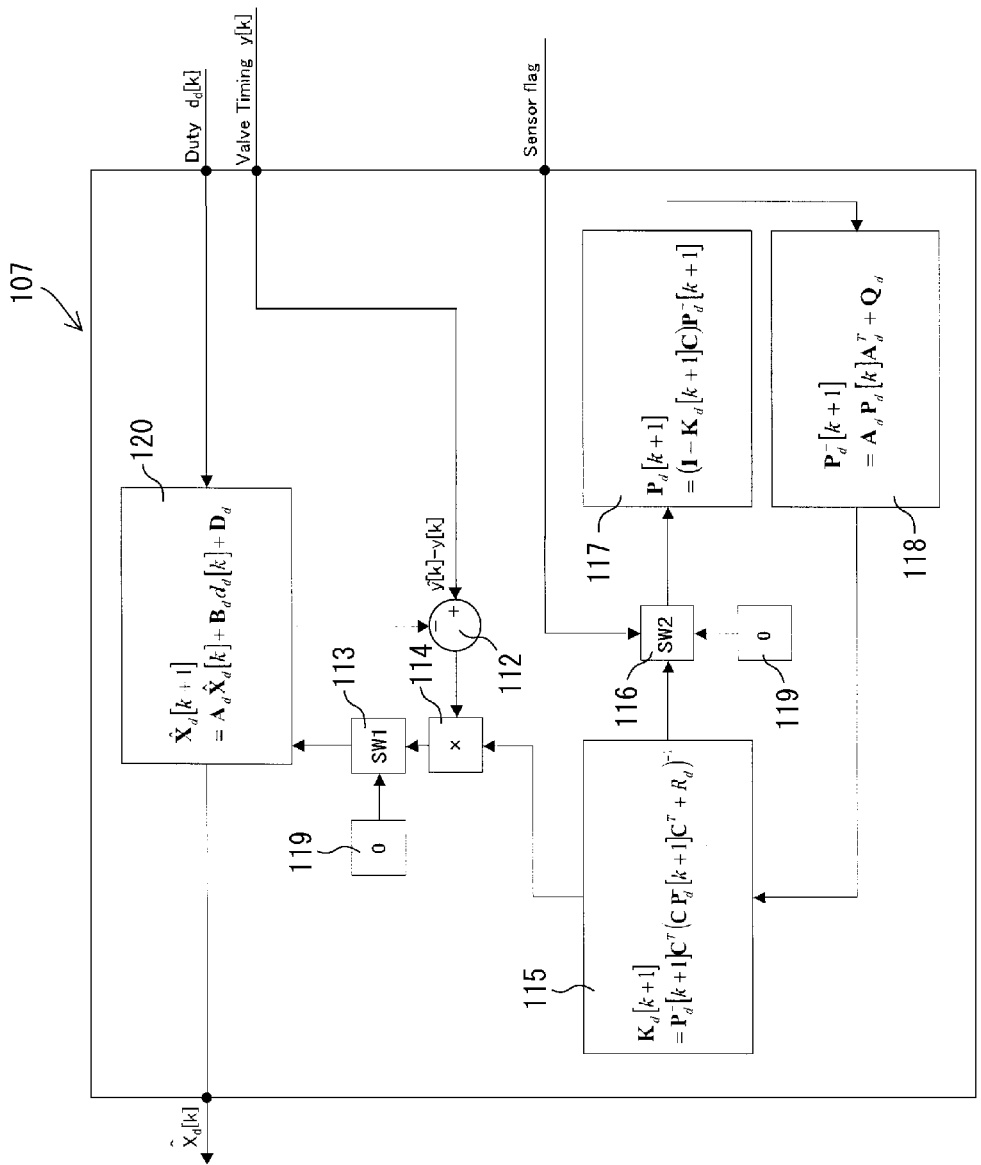
FIG. 6 is a block diagram showing an estimator of a phase varying apparatus which is a preferred embodiment of the present invention.

The phase varying apparatus estimator 107 will be described below in detail referring to the block diagram shown in FIG. 6. The right side of the phase varying apparatus estimator 107 shown in FIG. 6 shows an input and the left side thereof shows an output so as to coincide with FIG. 5. The phase varying apparatus estimator 107 according to the first embodiment of the present invention includes the Kalman filter 121 (a first formula of the mathematical formula 19 and a first formula of the mathematical formula 20), 115 (a third formula of the mathematical formula 20), 117 (a fifth formula of the mathematical formula 20) and 118 (a second formula of the mathematical formula 20) expressed in the mathematical formula 19 and the mathematical formula 20, a plurality of changing-over-switches 113, 115 whose input is switched by sensor flags and the like. Here, $P_d$ is a covariance matrix of discretized error, $Q_d$ is a weighting function of the Kalman filter, $K_d$ is a discretized Kalman gain and a symbol "$^-$" placed above X indicates that the value marked with the symbol is an estimated value. The sensor flag is that of a cam angle sensor 24 which is a proximity sensor for calculating the rpm of the camshaft 53. When the cam angle sensor 24 is ON, the sensor flag is set and when the cam angle sensor 24 is OFF, the sensor flag is not set. Depending on the kind of the sensor, the relationship between ON and OFF of the cam angle sensor 24 may be reverse and instead of the sensor for the camshaft 53, the sensor may be that for the crankshaft 22.

$$\begin{cases} \hat{X}_d[k+1] = A_d \hat{X}_d[k] + B_d d_d[k] + D_d \\ P_d[k+1] = A_d P[k] A_d^T + Q_d \end{cases}$$ [Mathematical Formula 19]

-continued $$\begin{cases} \hat{X}_d^-[k+1] = A_d \hat{X}_d[k] + B_d d_d[k] + D_d \\ P_d^-[k+1] = A_d P[k] A_d^T + Q_d \\ K_d[k+1] = P_d^-[k+1] C^T (C P_d^-(k+1) C^T + R_d)^{-1} \\ \hat{X}_d[k+1] = \hat{X}_d^-[k+1] + K_d[k+1]\{y_d[k+1] - C \hat{X}_d^-[k+1]\} \\ P_d[k+1] = (I - K_d[k+1] C) P_d^-[k+1] \end{cases}$$ [Mathematical Formula 20]

When the sensor flag is not set, a 0 value of 119 is selected by the changing-over-switch 113, 116, whereby the output from the first changing-over-switch 113 definitely becomes zero and the Kalman filter 120 expressed by the first formula of the mathematical formula 19 calculates an estimated relative angle value one step later from only the command value to the electromagnetic clutch 70 in the current step. Open-loop estimation is used to estimate this state.

When the sensor flag is set, the changing-over-switches 113, 116 select other than 0 value of 119. The estimated relative angle value is calculated by the Kalman filter 115, 117, 118 or 120 based on the relative angle in the current step and the command value to the electromagnetic clutch 70 in the current step. Closed-loop estimation is used to estimate this state. Each of these Kalman filters is an unscented Kalman filter used for a non-linear system.

When the flag of the sensor for detecting the rotation angle of the associated shaft is not set, the Kalman filter calculates an estimated relative angle value one step later based on only the command value to the electromagnetic clutch 70 in the current step. On the other hand, when the sensor flag is set, the Kalman filter calculates an estimated relative angle value one step later based on the relative angle in the current step and the command value to the electromagnetic clutch 70 in the current step. Therefore, an estimated relative angle value can be calculated by taking an accurate value in when the sensor responds, whereby an accurate command can be supplied to the electromagnetic clutch 70.

Figure 7:
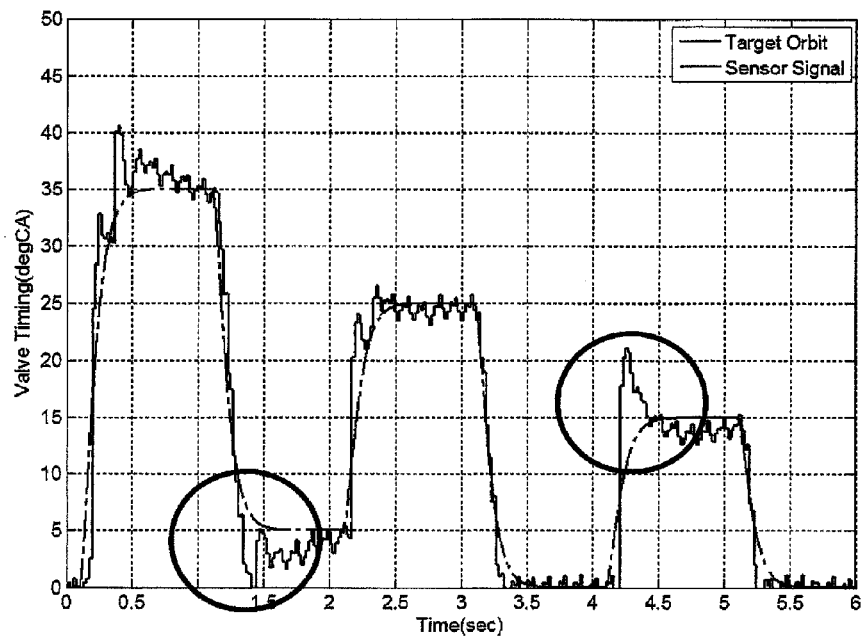
FIG. 7 is a diagram showing control results by a controlling method which is a preferred embodiment of the present invention.
Figure 7:
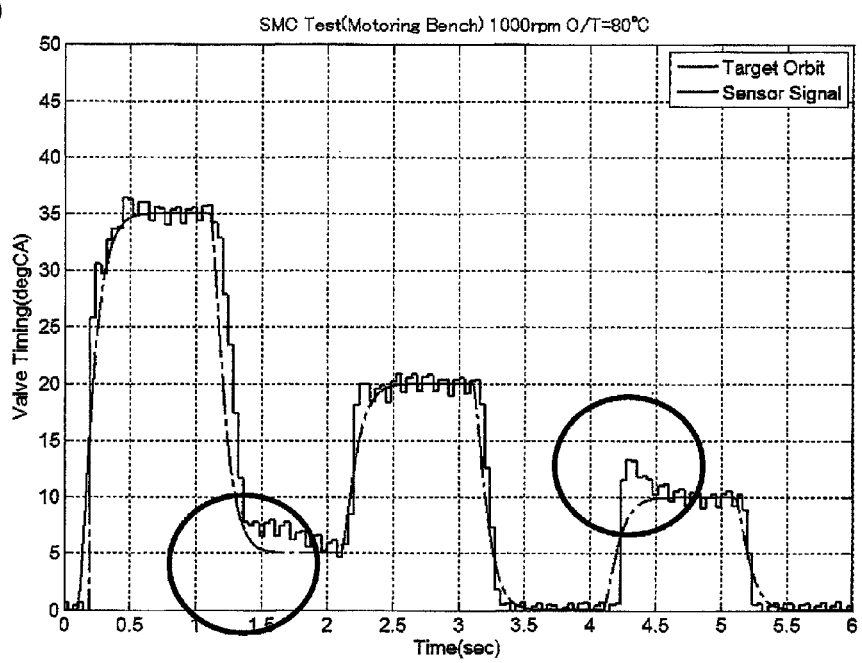

Results when the internal combustion engine 11 is controlled by the phase control method according to the first preferred embodiment of the present invention are shown in FIG. 7 wherein FIG. 7 (*a*) shows the results when the phase varying apparatus estimator 107 was not used and FIG. 7 (*b*) shows the results when the state was estimated by the phase varying apparatus estimator 107 according to the first embodiment of the present invention. In the graph of FIG. 7, X axis shows time and Y axis shows phase, namely, relative angle between the external cylinder portion 52 and the internal cylinder portion 54 in the phase varying apparatus 51. The engine rotational velocity was 1000 rpm and a dot-and-dash line graph shows the command values of the phase while a solid line graph shows actual measured values of the phase. Particularly, overshoot and undershoot can be checked immediately after the phase change (portions enclosed by a circle) and good responsivity can be obtained.

A phase varying apparatus estimator 107 according to a second preferred embodiment of the present invention is constituted so as to effect system identification of the phase varying apparatus 51 and calculate an estimated relative angle value. More specifically, the system identification of the phase varying apparatus 51 is effected by the Kalman filter in the phase varying apparatus estimator 107 based on the relative angle in the current step and the command value to the electromagnetic clutch 70 in the current step, thereby creating a parametric model in which states of respective elements in the phase varying apparatus 51 are identified. For example, a model in which a spring coefficient, viscosity and the like when the temperature environment in the phase varying apparatus 51 is changed can be created. Based on the thus created parametric model obtained by the system identification, an estimated relative angle value can be calculated.

The accuracy of a control model can be improved by effecting the system identification of the phase varying apparatus 51 using the Kalman filter and calculating an estimated relative angle value one step later using the parametric model created by the system identification. Thus, it is possible to supply a more accurate command to the electromagnetic clutch 70.

The explanation was made as to the control method and the control apparatus using the phase varying apparatus estimator 107, such as the Kalman filter, applied to the system using the sliding mode controller 103. However, the control method and the control apparatus according to the present invention can be applied to a general feedback controller other than the sliding mode controller 107, such as a PID controller.

DESCRIPTION OF REFERENCE NUMERALS 11 an internal combustion engine
12 an intake valve
13 an exhaust valve
22 a crankshaft
23 a crank angle sensor
24 a cam angle sensor
51 a phase varying apparatus
52 an external cylinder portion
53 a camshaft
54 an internal cylinder portion
55 an intermediate movement member
70 an electromagnetic clutch
101 an engine control unit (ECU)
102 a phase control apparatus
103 a sliding mode controller
107 a phase varying apparatus estimator
111 a feed forward controller

The invention claimed is:

1. A phase controlling method for controlling a phase varying apparatus for varying a valve timing of an engine valve in an internal combustion engine by varying a phase of rotation of a camshaft with respect to a crankshaft,
the phase varying apparatus comprising:
a driving rotor to which rotation is transmitted from the crankshaft,
a driven rotor which is coaxial with the driving rotor and disposed on a side of the camshaft and
a phase variation mechanism for varying a relative angle between the driving rotor and the driven rotor using an electromagnetic clutch to control the phase varying apparatus, wherein
a relative angle between the crankshaft and the camshaft in the current step, which is calculated based on a rotational velocity value of the crankshaft and the rotational velocity value of the camshaft, and a command value to the electromagnetic clutch in the current step are inputted into a phase varying apparatus estimator and, wherein
an estimated relative angle value one step later is calculated by Kalman filter based on the thus inputted values in the phase varying apparatus estimator, wherein
the thus calculated estimated relative angle value is input to a sliding mode controller as a feedback signal and a command value to the electromagnetic clutch one step later is calculated using common parameters to those used in the phase varying apparatus estimator based on the thus inputted value in the sliding mode controller so that the thus calculated command value is outputted to the phase varying apparatus.

2. A phase controlling method in accordance with claim 1, wherein the command value to the electromagnetic clutch is calculated from an output value from the sliding mode controller and an output value from a feed forward controller for equalizing a relative angle to a target phase angle registered in advance.

3. A phase controlling method in accordance with claim 1 or 2, wherein when a sensor flag from a sensor for detecting a rotation angle of the crankshaft or the camshaft in the internal combustion engine is not set, the Kalman filter calculates an estimated relative angle value one step later from only the command value to the electromagnetic clutch in the current step, and when the sensor flag is set, the Kalman filter calculates an estimated relative angle value one step later based on the relative angle in the current step and the command value to the electromagnetic clutch in the current step.

4. A phase controlling method in accordance with claim 1 or 2, wherein system identification of the phase varying apparatus is effected using the Kalman filter based on the relative angle in the current step and the command value to the electromagnetic clutch in the current step to create a parametric model and calculates the estimated relative angle value one step later using the parametric model.

5. A phase controlling method in accordance claim 3, wherein system identification of the phase varying apparatus is effected using the Kalman filter based on the relative angle in the current step and the command value to the electromagnetic clutch in the current step to create a parametric model and calculates the estimated relative angle value one step later using the parametric model.

6. A phase control apparatus for controlling a phase varying apparatus for varying a valve timing of an engine valve in an internal combustion engine by varying a phase of rotation of a camshaft with respect to a crankshaft, the phase varying apparatus comprising:
a driving rotor to which rotation is transmitted from the crankshaft,
a driven rotor which is coaxial with the driving rotor and disposed on a side of the camshaft, and
a phase variation mechanism for varying a relative angle between the driving rotor and the driven rotor using an electromagnetic clutch to control the phase varying apparatus,
the phase control apparatus further comprising:
a phase varying apparatus estimator for calculating an estimated relative angle value one step later by a Kalman filter using a relative angle between the crankshaft and the camshaft in the current step calculated based on a rotational velocity value of the crankshaft and a rotational velocity value of the camshaft and a command value to the electromagnetic clutch in the current step, and
a sliding mode controller for receiving the estimated relative angle value one step later as a feedback signal and calculating a command value to the electromagnetic clutch one step later using parameters common to those used for the calculation in the phase varying apparatus estimator based on the input vale of the feedback signal, and outputting the thus calculated command value one step later.

7. A phase control apparatus in accordance with claim 6, wherein the command value to the electromagnetic clutch is calculated based on an output value from the sliding mode controller and an output value from a feed forward controller for equalizing the relative angle to a target phase angle registered in advance.

8. A phase control apparatus in accordance with claim 6 or 7, which further comprises a phase varying apparatus estimator and in which when a sensor flag of a sensor for detecting a rotation angle of the crankshaft or the camshaft in the internal combustion engine is not set, the Kalman filter calculates the estimated relative angle value one step later from only the command value to the electromagnetic clutch in the current step, and when the sensor flag is set, the Kalman filter calculates the estimated relative angle value one step later based on the relative angle in the current step and the command value to the electromagnetic clutch in the current step and feeds back the estimated relative angle value one step later.

9. A phase control apparatus in accordance with claim 6 or 7, which further comprises a phase varying apparatus estimator for effecting system identification of the phase varying apparatus by the Kalman filter using the relative angle in the current step and the command value to the electromagnetic clutch in the current step to create a parametric model and the estimated the relative angle value one step later using the parametric model.

10. A phase control apparatus in accordance with claim 8, which further comprises a phase varying apparatus estimator for effecting system identification of the phase varying apparatus by the Kalman filter using the relative angle in the current step and the command value to the electromagnetic clutch in the current step to create a parametric model and the estimated the relative angle value one step later using the parametric model.

* * * * *